United States Patent
Stefanopoulou et al.

(10) Patent No.: US 10,422,293 B2
(45) Date of Patent: Sep. 24, 2019

(54) PREDICTIVE MODELING AND MITIGATION OF MISFIRES IN SPARK IGNITION ENGINES

(71) Applicant: THE REGENTS OF THE UNIVERSITY OF MICHIGAN, Ann Arbor, MI (US)

(72) Inventors: Anna G. Stefanopoulou, Ann Arbor, MI (US); Huan Lian, Ann Arbor, MI (US); Jason Brian Martz, Canton, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/573,388

(22) PCT Filed: May 13, 2016

(86) PCT No.: PCT/US2016/032281
§ 371 (c)(1),
(2) Date: Nov. 10, 2017

(87) PCT Pub. No.: WO2016/183409
PCT Pub. Date: Nov. 17, 2016

(65) Prior Publication Data
US 2018/0135548 A1    May 17, 2018

Related U.S. Application Data

(60) Provisional application No. 62/161,437, filed on May 14, 2015.

(51) Int. Cl.
*F02D 41/14* (2006.01)
*F02D 35/02* (2006.01)
(Continued)

(52) U.S. Cl.
CPC ......... *F02D 41/1498* (2013.01); *F02D 35/02* (2013.01); *F02D 35/024* (2013.01);
(Continued)

(58) Field of Classification Search
CPC ............... F02D 41/1498; F02D 41/144; F02D 41/1441; F02D 41/2429; F02D 41/2477;
(Continued)

(56) References Cited

U.S. PATENT DOCUMENTS

| | | | | |
|---|---|---|---|---|
| 6,006,157 | A | * 12/1999 | Dai | ........................ G01M 15/11 701/110 |
| 2003/0145836 | A1* | 8/2003 | Linna | ........................ F02B 1/12 123/501 |

(Continued)

FOREIGN PATENT DOCUMENTS

| | | |
|---|---|---|
| JP | 2006-063829 A | 3/2006 |
| JP | 4200777 B2 | 12/2008 |

(Continued)

OTHER PUBLICATIONS

Z Chen et al "Theoretical analysis of the evolution from ignition kernel to flame ball and planar flame." Combustion Theory and Modelling, vol. 11, No. 3. (Apr. 2007).
(Continued)

*Primary Examiner* — Lindsay M Low
*Assistant Examiner* — George C Jin
(74) *Attorney, Agent, or Firm* — Harness, Dickey & Pierce, P.L.C.

(57) ABSTRACT

A method and apparatus to predict and enable control of misfire that influences combustion cyclic variation and COV of IMEP in spark-ignited (SI) engine. The method includes obtaining engine data and determining temperature and pressure within a cylinder in response to engine data; determining crank angle resolved flame velocity evolution based on the engine data; comparing the crank angle resolved flame velocity to predetermined turbulent combustion regime data to determine a misfire occurrence; and updating a misfire occurrence indicator and outputting a control signal when the misfire occurrence indicator is greater than a predetermined limit, the control signal being capable of adjusting any engine actuators, such as external ignition source, of the spark-ignited engine on a cycle to
(Continued)

cycle basis. The method and apparatus further includes correlating the crank angle resolved flame velocity to combustion phasing when the misfire occurrence indicator is less than the predetermined limit.

16 Claims, 7 Drawing Sheets

(51) Int. Cl.
  *F02P 5/15* (2006.01)
  *G01M 15/11* (2006.01)
(52) U.S. Cl.
  CPC .......... *F02D 35/026* (2013.01); *F02P 5/1502* (2013.01); *G01M 15/11* (2013.01); *F02D 35/028* (2013.01); *F02D 2041/1412* (2013.01); *F02D 2041/1433* (2013.01); *F02D 2200/1015* (2013.01); *Y02T 10/46* (2013.01)
(58) Field of Classification Search
  CPC .. F02D 41/2487; F02D 35/024; F02D 35/026; F02D 35/02; F02D 2200/1015; F02P 5/1502; F02P 5/1514; F02P 5/153; G01M 15/11

See application file for complete search history.

(56) References Cited

U.S. PATENT DOCUMENTS

2006/0157029 A1* 7/2006 Suzuki .................. F02P 5/1514
                                                    123/406.33
2012/0303247 A1    11/2012 Minami et al.
2016/0025060 A1*  1/2016 Estefanous ............ F02P 5/152
                                                    123/406.19

FOREIGN PATENT DOCUMENTS

JP      2012-062805 A    3/2012
JP      2014-088864 A    5/2014

OTHER PUBLICATIONS

Robert J. Middleton et al. A computational study and correlation of premixed isooctane air laminar reaciton frontsfronts diluted with EGR. Combustion and Flame, vol. 159, No. 10. (Oct. 2012).

H. Lian et al. "Prediction of Flame Burning Velocity at Early Flame Development Time With High Exhaust Gas Recirculation (EGR) and Sark Advance." ASME 2016 Internal combustion Engine Fal Technical Conference. (Oct. 2016).

Extended European Search Report of the European Patent Office issued in EP16793589.9, dated Nov. 6, 2018.

International Search Report and Written Opinion of the International Searching Authority issued in PCT/US2016/032281, dated Aug. 16, 2016; ISA/KR.

International Preliminary Report on Patentability dated Nov. 23, 2017 regarding PCT/US2016/032281.

* cited by examiner

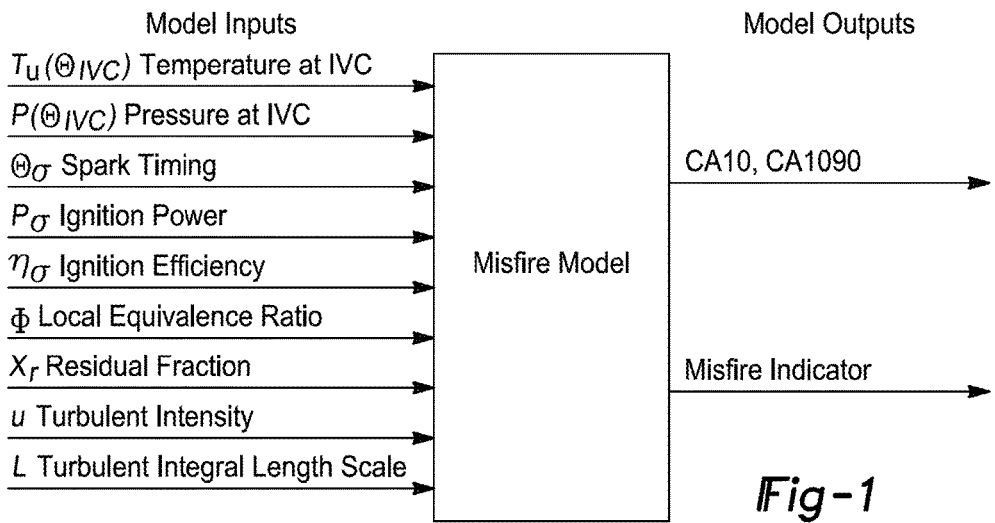
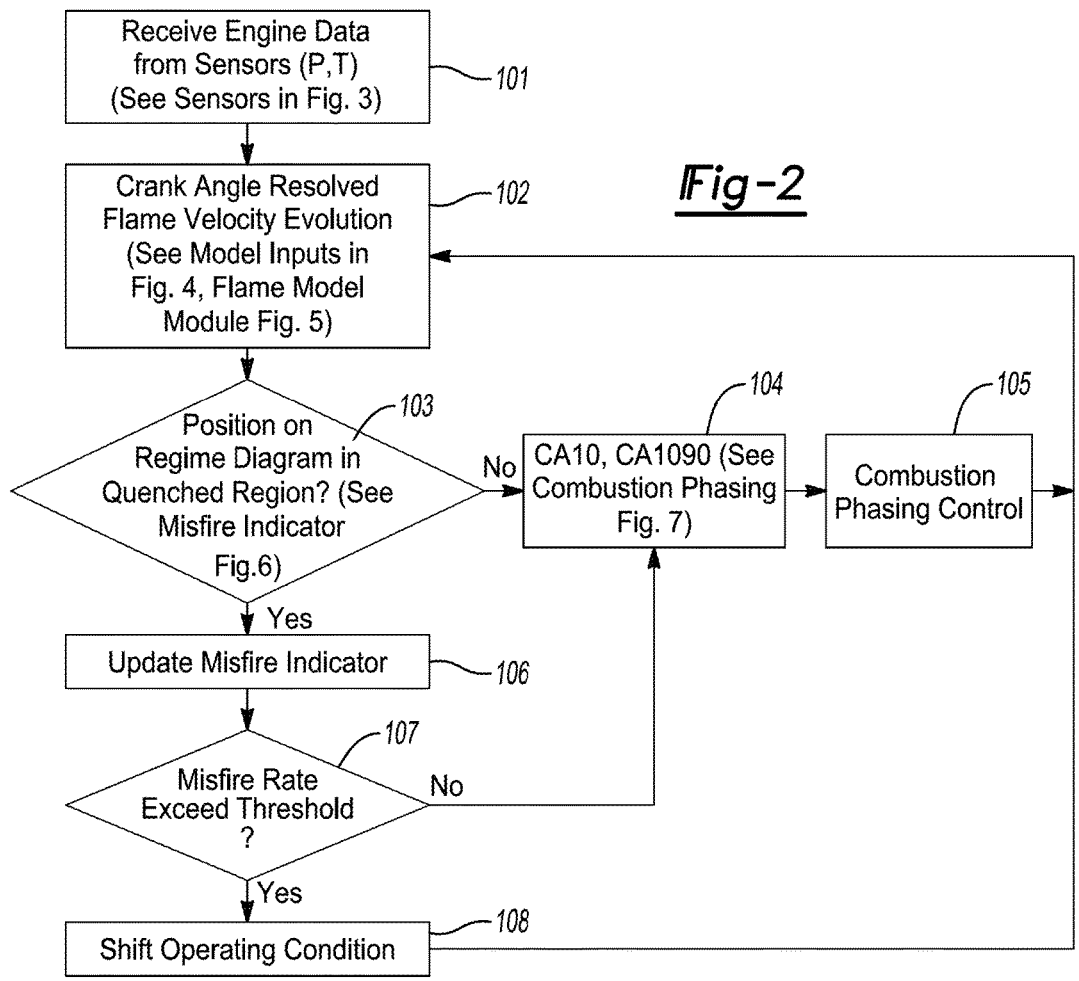

PREDICTIVE MODELING AND MITIGATION OF MISFIRES IN SPARK IGNITION ENGINES

CROSS-REFERENCE TO RELATED APPLICATIONS

This application is a U.S. National Phase Application under 35 U.S.C. 371 of International Application No. PCT/US2016/032281 filed on May 13, 2016 and published in English as WO 2016/183409 A1 on Nov. 17, 2016. This application claims the benefit of U.S. Provisional Application No. 62/161,437 filed on May 14, 2015. The entire disclosures of the above applications are incorporated herein by reference in their entirety.

FIELD

The present disclosure relates to a physics-based predictive model having the ability to predict and enable control of misfire that influences combustion cyclic variation and convariance of indicated mean effective pressure (COV of IMEP).

BACKGROUND AND SUMMARY

This section provides background information related to the present disclosure which is not necessarily prior art. This section provides a general summary of the disclosure, and is not a comprehensive disclosure of its full scope or all of its features.

Diluting Spark-Ignited (SI) stoichiometric combustion engines with excess residual gas reduces throttling losses and improves thermal efficiency. In normal operation, the spark is advanced towards Maximum Break Torque (MBT) timing. However, combustion instability, misfire, and knock limit the feasible range of spark timings. For certain operating conditions, it is desirable to continuously operate at the border of the feasible spark region. For instance, with high Exhaust Gas Recirculation (EGR) dilution, the MBT timings are located at a spark advance beyond the misfire limits.

Traditionally, spark timing is an open-loop feed forward control with misfire limits determined for a specific engine from extensive experiments covering a large range of speed, torque, and actuator settings. To extend the benefits of dilute combustion while at the misfire limit, it is essential to define a parameterizable, physics-based model capable of predicting the misfire limit as operating conditions change based on driver demand.

According to the principles of the present teachings, a predictive modeling and mitigation methodology is provided to predict and mitigate misfire occurrence and combustion phasing in a variable volume SI engine system. The misfire model describes the early flame development period of 0 to 3 percent mass fraction burned and considers the effect of ignition characteristics, local fuel to air equivalence ratio, flame kernel initiation, and planar flame interaction with in-cylinder turbulence.

In some embodiments, the present teachings provide a method and apparatus to predict and enable control of misfire that influences combustion cyclic variation and COV of IMEP in spark-ignited (SI) engine. The method can include obtaining engine data and determining temperature and pressure within a cylinder in response to engine data; determining crank angle resolved flame velocity evolution based on the engine data; comparing the crank angle resolved flame velocity to predetermined turbulent combustion regime data to determine a misfire occurrence; and updating a misfire occurrence indicator and outputting a control signal when the misfire occurrence indicator is greater than a predetermined limit, the control signal being capable of adjusting any engine actuator, such as external ignition source on a cycle to cycle basis of the spark-ignited engine. The method and apparatus can further include correlating the crank angle resolved flame velocity to combustion phasing when the misfire occurrence indicator is less than the predetermined limit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a misfire model structure according to the present teachings having a plurality of inputs and outputs;

FIG. 2 is a flowchart illustrating a misfire and combusting phasing estimation method and control actions according to the present teachings;

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As described herein, according to the principles of the present teachings, a predictive modeling and mitigation methodology is provided to predict and mitigate misfire occurrence and combustion phasing in a variable volume SI engine system. The misfire model describes the early flame development period of 0-3% mass fraction burned and considers the effect of ignition characteristics, local equivalence ratio, flame kernel initiation, and planar flame interaction with in-cylinder turbulence.

Figure 3:
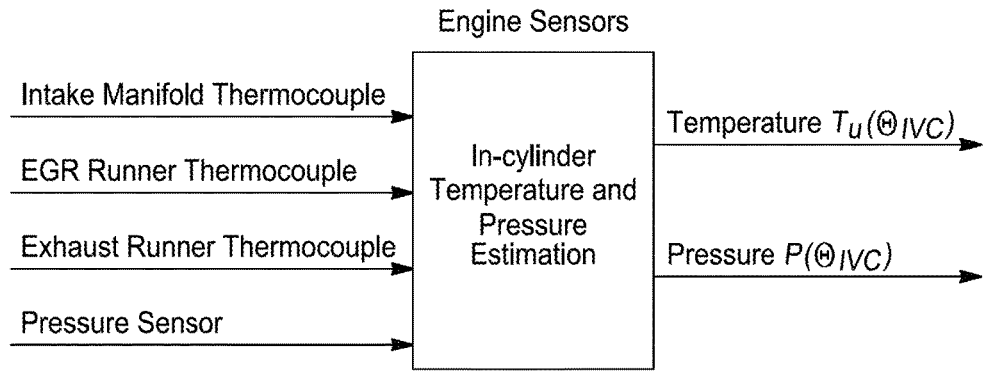
FIG. 3 is a schematic view of engine sensors for in-cylinder temperature and pressure estimation.
Figure 4A:
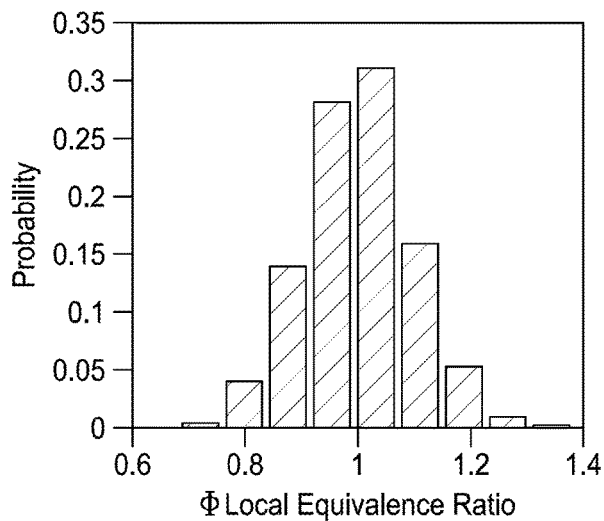
FIGS. 4A and 4B are graphs illustrating the cyclic distributed probability of local equivalence ratio and efficiency of ignition power transferred to the fuel and air mixture, respectively.
Figure 4B:
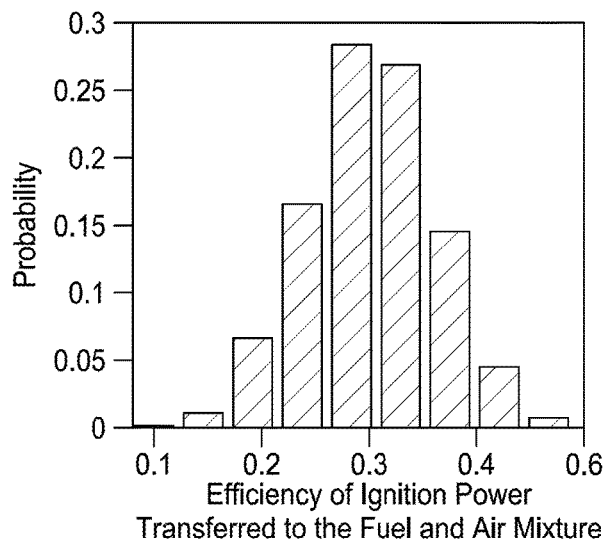
Figure 7:
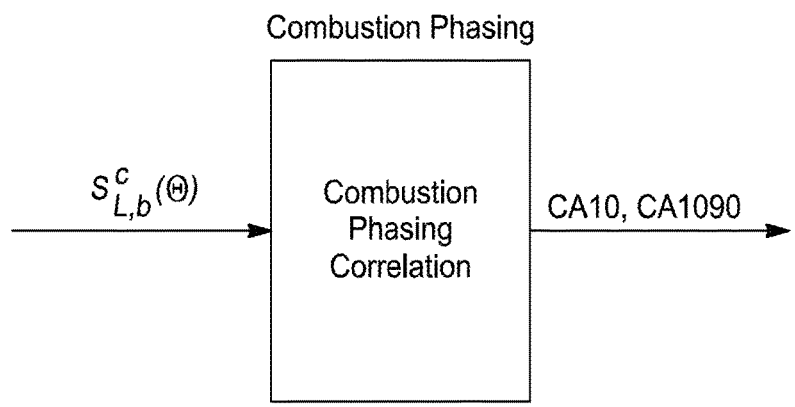
FIG. 7 is a schematic view of a combustion phasing correlation module according to the present teachings.
Figure 12:
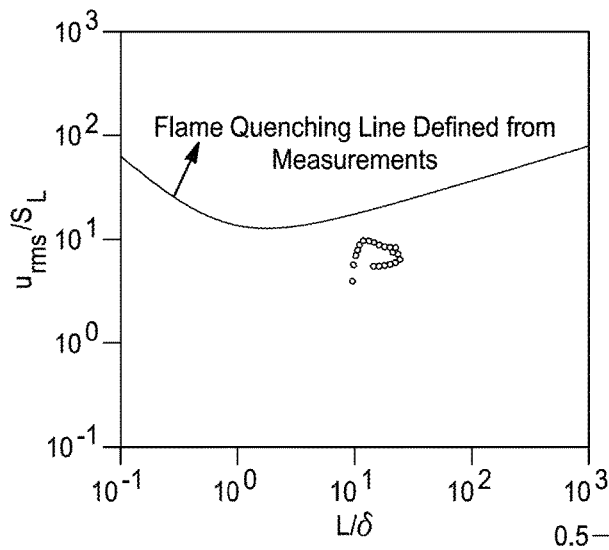
FIG. 12 is a graph illustrating projection on turbulent combustion regime diagram.

As illustrated in FIG. 1, the predictive modeling and mitigation system or control system according to some embodiments of the present teachings is provided. Additionally, a method of predictive modeling and mitigation of misfires is illustrated as a flowchart in FIG. 2. With particular reference to FIG. 2, in some embodiments, the method comprises step 101 whereby the in-cylinder temperature and pressure are estimated from one or more engine sensors, such as those illustrated in FIG. 3. For example, in some embodiments, the engine sensors can comprise an intake manifold thermocouple, an EGR runner thermocouple, an exhaust runner thermocouple, a pressure sensor, or any combination thereof. The engine sensors can output temperature and/or pressure information. At step 102, calculation of crank angle resolved flame velocity evolution is determined, with cycle-to-cycle variations introduced to local equivalence ratio and ignition efficiency. The cyclic distributions of these two model inputs are illustrated in FIGS. 4A and 4B. In some embodiments, the remaining model inputs defined in FIG. 1 are considered as engine design parameters and are computed off-line. The crank angle resolved flame velocity evolution is projected onto a turbulent combustion regime diagram in step 103. The position of the projection indicates whether the planer flame is quenched or viable as indicated in FIG. 12. Cycle to cycle variation in the ignition power deposited to fuel and air mixture as well as the variation in local air to fuel equivalence ratio propagate through the model and result in cyclic binomially distributed misfires as further indicated in FIG. 12 by the distributive nature of the depicted data. For the case of a misfire, a numeric misfire indicator is defined and updated in step 106. When the misfire indicator exceeds a certain arbitrarily defined threshold in step 107, operating condition is shifted to mitigate misfire in step 108 by adjusting any engine actuator, such as the external ignition source (i.e. spark), on a cycle to cycle basis. For the case of viable flame, the calculated flame velocity is correlated to combustion phasing in step 104, which is detailed in FIG. 7 for combustion rate shaping control in step 105 by adjusting any engine actuator, such as an external ignition source, on a cycle to cycle basis.

Figure 5:
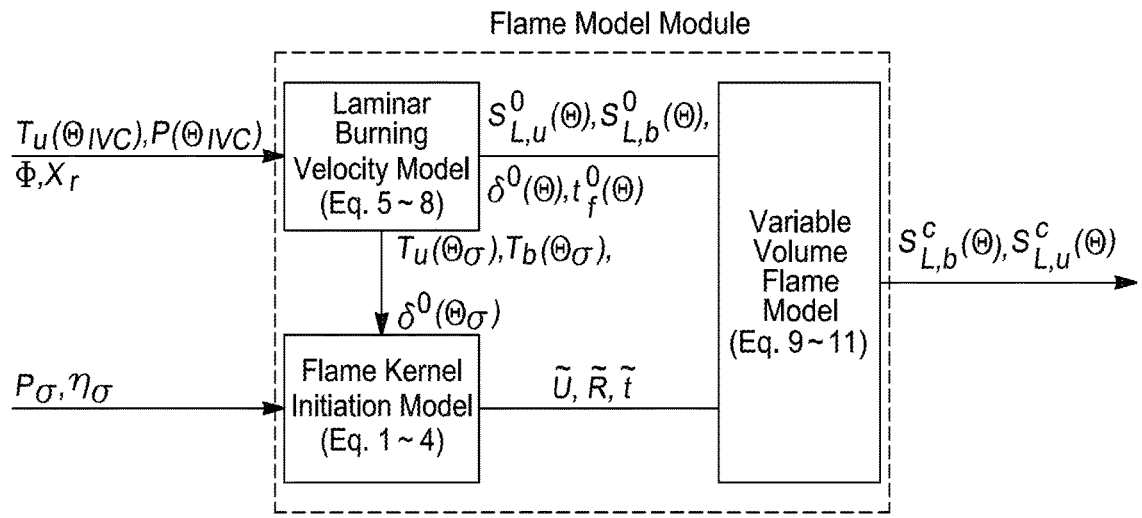
FIG. 5 is a schematic view of a flame model module according to the present teachings.
Figure 6:
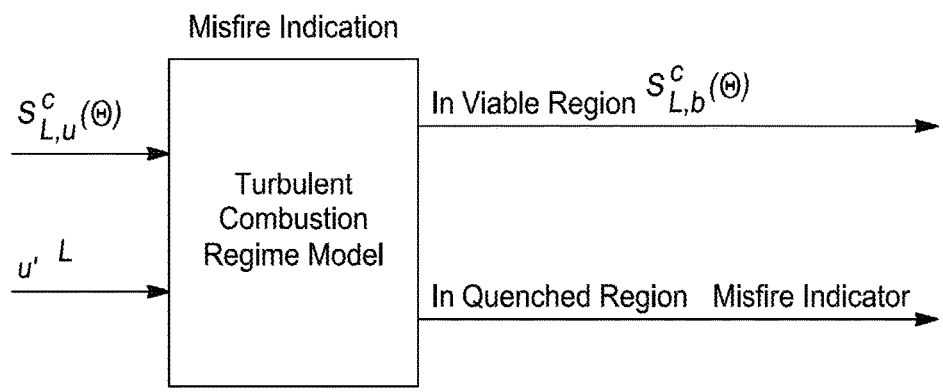
FIG. 6 is a schematic view of a turbulent combustion regime model according to the present teachings.

With particular reference to FIGS. 5 and 6, steps 102 and 103 are illustrated in greater detail. Accordingly, the flame model module consists of four main components: A flame kernel initiation model numerically simplified and developed from a theoretical thermal diffusion flame ball model with real-time computing capability; a correlation based laminar flame burning velocity model; a variable volume flame model and a turbulent combustion regime model that determines the occurrence of misfire. Each of the model components is executed on a crank angle basis. The non-dimensional flame kernel initiation model returns a spherical flame trajectory, represented by the normalized flame burning velocity $\tilde{U}$ and the normalized flame radius $\tilde{R}$. This constant volume static model has been adapted to a variable volume system to provide correction to the unstretched and adiabatic laminar flame burning velocity prediction to account for the effects of curvature induced flame stretch and on the normalized ignition power deposited to mixture. The laminar flame speed model returns the laminar flame burning velocity $S_{L,u}^0$ and $S_{L,b}^0$ with respect to the unburned and burned gases, as well as the laminar flame thickness $\delta$ correlated to the unburned temperature $T_u(\theta)$ in front of the flame, the in-cylinder pressure $P(\theta)$, the total residual fraction $x_r$, and the local fuel-to-charge equivalence ratio corrected for dilution. The variable volume flame and turbulent combustion regime models determine the misfire occurrence by projecting the crank angle resolved flame velocity onto the combustion regime diagram with the turbulent intensity u' and integral length scale L pre-computed from Computational Fluid Dynamics (CFD) simulations.

Flame Kernel Initiation Model

The non-dimensional flame kernel model describes the first mechanism with the radial flame velocity, along with curvature induced stretching and flame kernel failure due to insufficient ignition energy. Flame kernel dynamics from ignition to flame ball and to planar flame behavior were studied theoretically by Chen and Ju. A detailed model description can be found in this reference. Neglecting radiation heat loss, the theoretically derived relationship between the non-dimensional normalized flame radius $\tilde{R}=R/\delta^0$ and the flame burning velocity $\tilde{U}=S_{L,b}/S_{L,b}^0$ is expressed as:

$$\tilde{T}_f \frac{\tilde{R}^{-2}e^{-\tilde{U}\tilde{R}}}{\int_{\tilde{R}}^{\infty}\tilde{\tau}^{-2}e^{-\tilde{U}\tilde{\tau}}d\tilde{\tau}} - \tilde{P}_{ign}\tilde{R}^{-2}e^{-\tilde{U}\tilde{R}} = \frac{1}{Le}\frac{\tilde{R}^{-2}e^{-\tilde{U}Le\tilde{R}}}{\int_{\tilde{R}}^{\infty}\tilde{\tau}^{-2}e^{-\tilde{U}Le\tilde{\tau}}d\tilde{\tau}} = \exp\left[\frac{Z}{2}\frac{\tilde{T}_f-1}{\tilde{\sigma}+(1-\tilde{\sigma})\tilde{T}_f}\right]. \tag{1}$$

where $\tilde{\tau}$ is a small radius increment; $\tilde{\sigma}=T_\infty/T_{ad}$ is the expansion ratio; Le and Z are the Lewis number and Zel'dovich number; $\tilde{T}_f$ is the flame front temperature normalized by the adiabatic flame temperature where $\tilde{T}_f=T_f/T_b=1$. $\tilde{P}_\sigma$ is the normalized ignition power, defined as:

$$\tilde{P}_\sigma = \frac{P_\sigma}{4\pi\lambda\delta^0(T_b - T_u)}. \quad (2)$$

where $\lambda$ is the thermal conductivity and $\delta^0$ is the laminar flame thickness obtained from Middleton et al.

Assuming unity Lewis number (Le=1) and a thermal conductivity $\lambda$ of 0.1 [W/m-k][11], Eq. 1 is further simplified to:

$$\tilde{R}^{-2}e^{-\tilde{U}\tilde{R}}/\int_{\tilde{R}}^{\infty}\tilde{\tau}^{-2}e^{-\tilde{U}\tilde{\tau}}d\tilde{\tau}=1+\tilde{P}_\sigma\tilde{R}^{-2}e^{-\tilde{U}\tilde{R}}. \quad (3)$$

Figure 8:
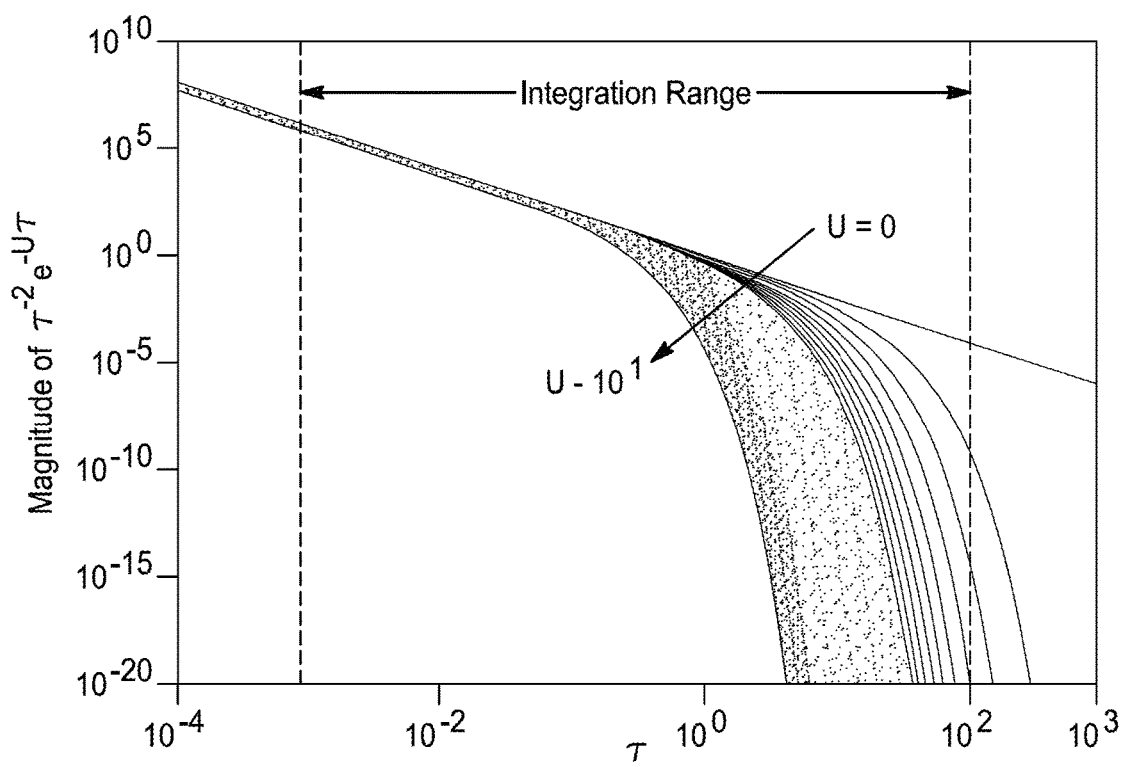
FIG. 8 is a graph illustrating a simplified numerical integration range of $\tilde{\tau}^{-2} e^{-\tilde{U}\tilde{\tau}} d\tilde{\tau}$.

An analytical solution does not exist for $\int_{\tilde{R}}^{\infty}\tilde{\tau}^{-2}e^{-\tilde{U}\tilde{\tau}}d\tilde{\tau}$ in Eq. 3, so it is solved numerically with the trapezoidal rule for $\tau$ in the vicinity of 1. The function $\tilde{\tau}^{-2}e^{-\tilde{U}\tilde{\tau}}d\tilde{\tau}$ decreases exponentially with $\tau$ as shown in FIG. 8. The range of the normalized flame radius $\tilde{R}$ is bounded to $10^{-3}$ to $10^2$ without sacrificing computational accuracy.

When sweeping the normalized flame radius $\tilde{R}$ in the range of $10^{-3}$ to $10^2$, Eq. 1 yields the flame burning velocity $\tilde{U}=S_{L,b}/S_{L,b}^0$ for a given normalized flame radius $\tilde{R}=R_f/\delta^0$.

With sufficient ignition power for a viable flame kernel, the normalized time $\tilde{t}$ is approximated from the normalized flame radius $\tilde{R}$ and flame burning velocity $\tilde{U}$:

$$\tilde{t} = \int_0^{\tilde{t}(\tilde{R})} d\tilde{t} = \int_0^{\tilde{R}} \frac{1}{\tilde{U}} d\tilde{R}. \quad (4)$$

Figure 9:
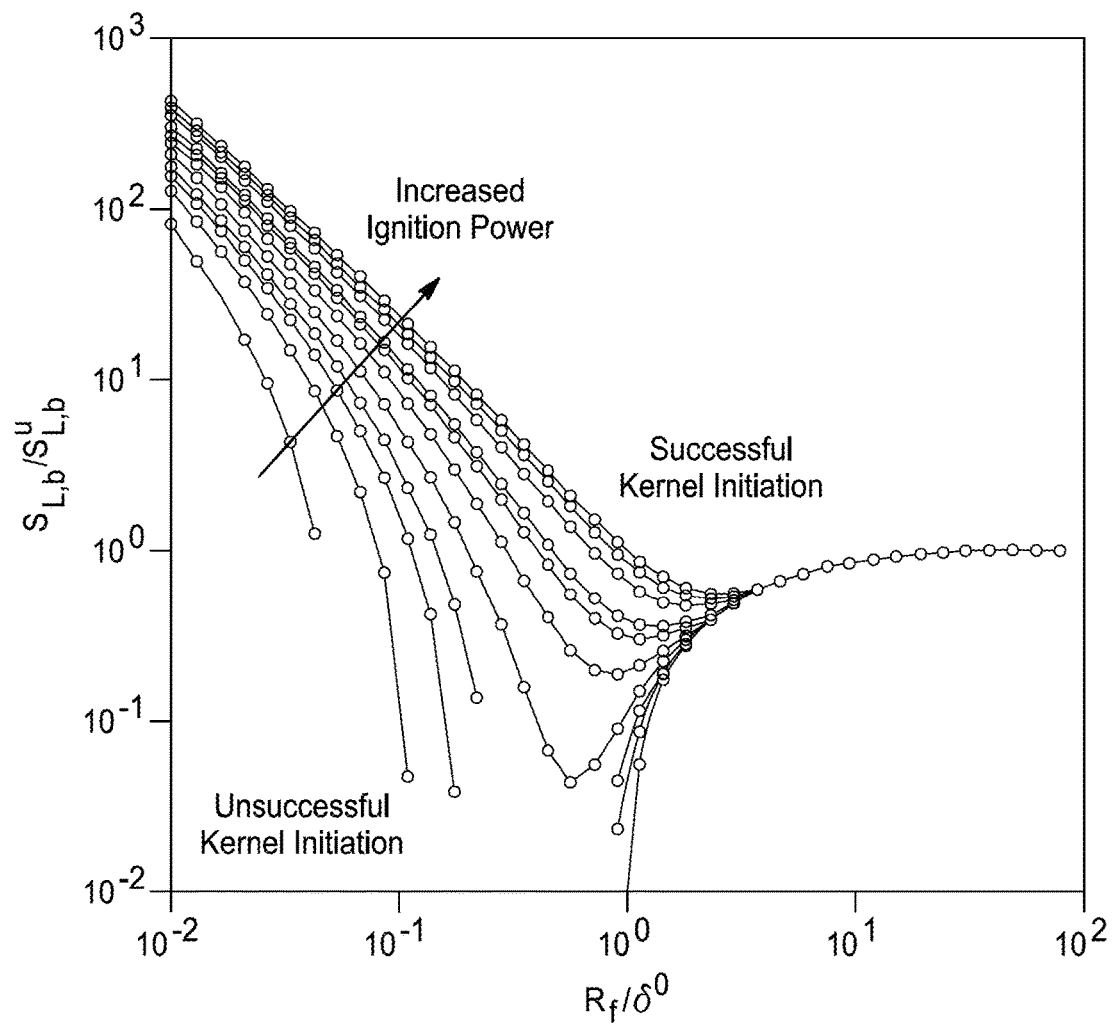
FIG. 9 is a graph illustrating a relationship between the normalized flame radius $\tilde{R} = R_f/\delta^0$ and flame burning velocity $\tilde{U} = S_{L,b}/S_{L,b}^0$ for varying ignition power $\tilde{P}_\sigma$.

In summary, the relationship between the normalized flame radius $\tilde{R}=R_f/\delta^0$ and the flame burning velocity $\tilde{U}=S_{L,b}/S_{L,b}^0$ is determined from a single input: the normalized ignition power $\tilde{P}_\sigma$. An example of this relationship is shown in FIG. 9 for the varied normalized ignition power ranging from that required for unsuccessful to successful kernel initiation. Note that the normalized flame burning velocity converges to 1 as flame radius increases, suggesting that the ignition kernel develops into a spherical flame ball propagating at the unstretched laminar flame burning velocity $S_{L,b}^0$.

Laminar Burning Velocity Model

The second mechanism is included in the model by dimensionalizing the relationship between the normalized flame radius $\tilde{R}=R_f/\delta^0$ and flame burning velocity $\tilde{U}=S_{L,b}/S_{L,b}^0$, with the laminar flame burning velocities estimated from an isooctane-air laminar flame speed correlation that includes the effect of EGR. Here $S_{L,u}^0$ is the laminar flame burning velocity with respect to the unburned mixture, $\delta$ is the laminar flame thickness and $T_b$ is the adiabatic flame temperature. These parameters are correlated to the unburned temperature $T_u(\theta)$ in front of the flame, the in-cylinder pressure $P(\theta)$, the EGR rate $x_{egr}$ and the local fuel-to-charge equivalence ratio $\phi'$ defined by Eq. 5 where $\Phi$ is the global fuel-to-air equivalence ratio.

$$\phi' = \frac{(1-x_{egr})\Phi}{1-x_{egr}\Phi}. \quad (5)$$

The laminar flame burning velocity is expressed with respect to the unburned mixture as $S_{L,u}^0$. $S_{L,b}^0$ is the burning velocity with respect to the burned gas, which is needed for comparison with the experimental measurements. Mass conservation at the flame front yields:

$$S_{L,b}^0 = \frac{\rho_u}{\rho_b} S_{L,u}^0. \quad (6)$$

Invoking the ideal gas law, Eq. 6 is approximated as:

$$S_{L,b}^0 = \frac{T_b}{T_u} S_{L,u}^0. \quad (7)$$

where $T_b$ is the correlated adiabatic flame temperature from reference and $T_u$ is the temperature of the unburned mixture in front of the flame.

Variable Volume Flame and Turbulent Combustion Regime Models

The third mechanism is modeled here. For variable volume engine applications, the pressure and temperature evolve as a function of crank angle $\theta$. To implement the laminar burning velocity correlation and the non-dimensional model of the symmetric spherical ball, the flame evolution is approximated as discretized events with negligible change in pressure and temperature at each crank angle. For the early flame development period corresponding to 0 to 3 percent mass fraction burned, the pressure rise due to combustion is not significant. The polytrophic compression pressure and temperature are used in the current modelling work.

With a fixed EGR rate $x_{egr}$, and local fuel to charge equivalence ratio $\phi'$ is estimated from Eq. 5 under stoichiometric conditions. The laminar burning velocity $S_{L,b}^0$, laminar flame thickness $\delta^0$ and reaction front timescale $t_f^0$ are determined from the pressure P and unburned temperature $T_u$ at each crank angle $\theta$ during the early combustion phase immediately after ignition timing $\theta_\sigma$:

$$S_{L,b}^0(\theta)=f_1(P(\theta),T_u(\theta),x_{egr},\phi')$$

$$\delta^0(\theta)=f_2(P(\theta),T_u(\theta),x_{egr},\phi')$$

$$t_f^0(\theta)=\delta^0(\theta)/S_{L,b}^0(\theta). \quad (8)$$

At a given crank angle, the trajectory of the spherical flame ball with a flame radius $R_f$ and flame travel time t is obtained from the normalized flame trajectory $\tilde{R}$ and $\tilde{t}$, the laminar flame thickness $\delta^0$ and flame reaction front timescale $t_f^0$:

$$R_f(\theta)=\tilde{R}\times\delta^0(\theta)$$

$$t(\theta)=\tilde{t}\times t_f^0(\theta). \quad (9)$$

To correct for flame curvature induced stretching, the corrected laminar flame burning velocity $S_{L,b}^c(\theta)$ is defined as the local derivative calculated using backward Euler method from the flame trajectory at each crank angle:

$$S_{L,b}^c(\theta) = \frac{dR_f(\theta)|_k}{dt(\theta)|_k}. \quad (10)$$

where $t(\theta)|_k$ and $R_f(\theta)|_k$ are crank angle resolved via the crank angle to time conversion:

$$t(\theta)|k=(\theta-\theta_\sigma)/(6 \text{ rpm}). \quad (11)$$

Figure 10:
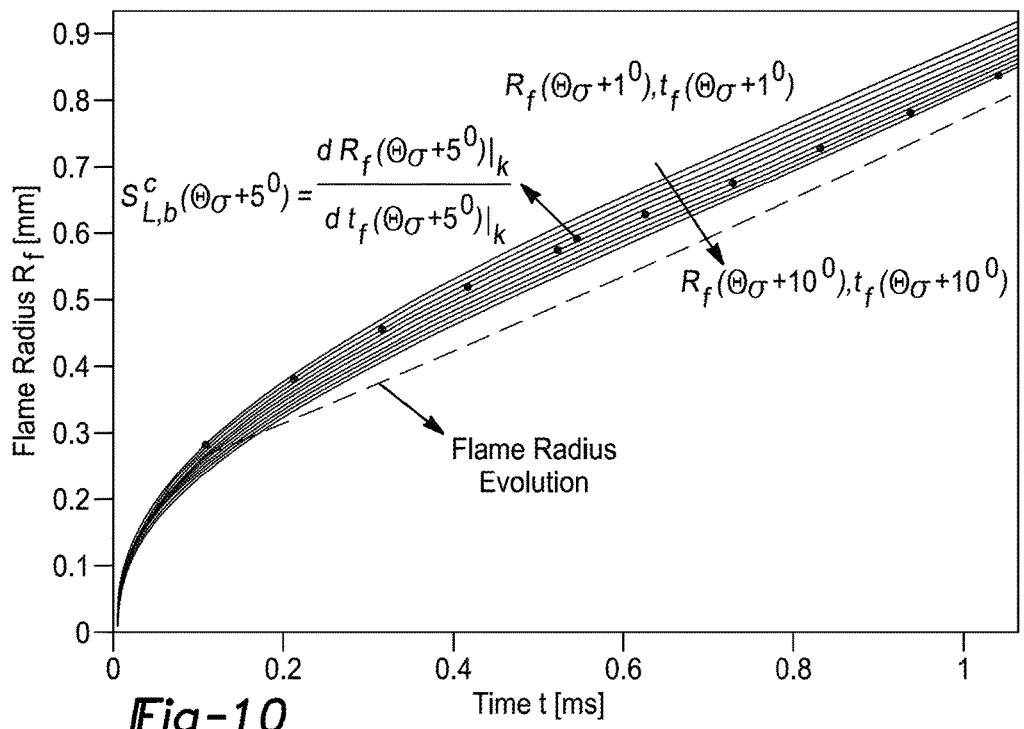
FIG. 10 is a graph illustrating the laminar flame burning velocity $S_{L,b}^c(\theta)$ corrected for curvature induced stretching from 1 to 10 degrees after ignition timing.

The process described in Eq. 9 to Eq. 11 is illustrated in FIG. 10 from 1 to 10 degrees after ignition timing. The 10 flame trajectories of flame radius $R_f$ and flame time t are plotted as black lines. The corrected laminar flame burning velocity $S_{L,b}{}^c(\theta)$ at 5 degrees after ignition is defined as the distance per time ratio $S_{L,b}{}^c(\theta)$, which is shown as the slope of the fifth red dashed line.

Figure 11:
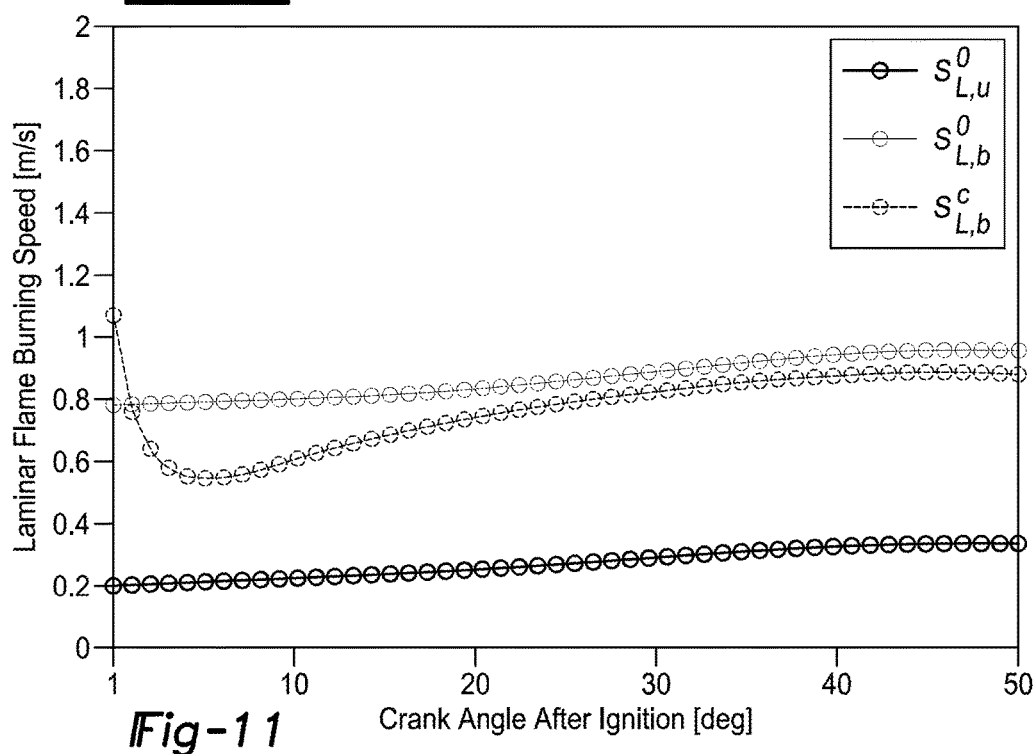
FIG. 11 is a graph illustrating crank angle resolved laminar flame burning velocity $S_{L,u}^0$, $S_{L,b}^0$ with respect to the unburned/burned mixture, and the corrected laminar flame burning velocity $S_{L,b}^c$ (45° bTDC spark timing and 25% total residual fraction)

The crank angle resolved laminar flame burning velocity $S_{L,u}{}^0$, $S_{L,b}{}^0$ and the corrected laminar flame burning velocity $S_{L,b}{}^c$ are shown in FIG. 11 at 45 bTDC° spark timing and 25% total residual fraction. $S_{l,u}{}^0$ is approximately 3 to 4 times higher than $S_{L,b}{}^0$ due to the burned gas expansion effect, $S_{L,b}{}^0$ is further corrected for curvature induced stretching as $S_{L,b}{}^c$. It should be noted that at the initial phase (<10 degree after ignition), $S_{L,b}{}^c$ is higher than the laminar burning velocity $S_{L,b}{}^0$. This is caused by the deposition of ignition energy during the first a few hundred microseconds, shown as the steeper slope $dR_{f,k}/dt_k$ in the range of $10^{-1}$ milliseconds in FIG. 10. The ignition energy affects decreases with $\tilde{R}$ as the flame moves away from the ignition energy source.

The crank angle resolved corrected laminar flame burning velocity $S_{L,b}{}^c$ is projected onto the turbulent combustion regime diagram. An example is shown in FIG. 12. The relative positioning of the ratio between r.m.s. turbulent velocity and laminar flame speed $u/S_L$, and the ratio of integral length scales and laminar flame thickness $\delta$ determines if the planar flame quenched or is viable. If positioned in the upper left region of the regime diagram where the energy containing scales of turbulence is dominant, the flame is regarded as quenched and consequently resulting in a misfires.

Figure 13A:
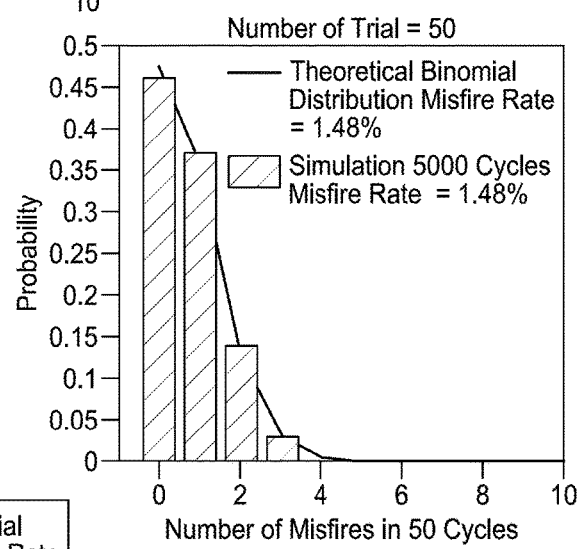
FIGS. 13A and 13B illustrate modeled cyclic distribution of misfire occurrence follows theoretical binomial distribution for 50 cycles and 100 cycles, respectively.
Figure 13B:
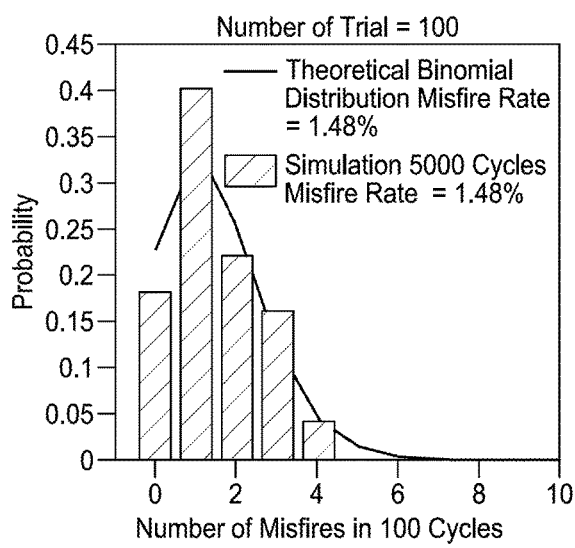

Cycle to cycle variation in the ignition power deposited to the fuel and air mixture as well as variation in the local air to fuel equivalence ratio propagate through the model and result in cyclic binomially distributed misfires. An example with misfire rate of 1.48% is shown in FIG. 13. The modeled cyclic distribution of misfire occurrence follows theoretical binomial distribution in both 50 and 100 number of trials.

The early flame development time corresponds to 0-3% mass fraction burned has been identified as a significant fraction of the total burn duration (around 30%). The early flame initiation and evolution contribute significantly to misfire occurrence and are mainly governed by the coupling of the following mechanisms:

1. The laminar burning velocity, which is governed by the in-cylinder thermodynamic states and the chemical characteristics of the unburnt mixture. A significant source of variation is caused by the non-homogeneity of unburned mixture, which is described as the local equivalence ratio at the gap of the spark plug electrodes.

2. The variation in ignition power deposited by the spark plug and the variation in actual ignition power transferred to the fuel and air mixture. Variations are caused by the heat loss to spark plug electrodes governed by the flame contact area A which has been found to have a significant impact on the kernel initiation process via associated flame temperature reduction.

3. The variation in-cylinder bulk flow motion and effect of turbulent strain rates.

The in-cylinder bulk flow motion, i.e. the tumble flow introduces the convection velocity component to the flame kernel. This affects the flame contact area and as a result the ignition energy deposition process.

When the flame size is on the same order as the turbulent integral length scale, the turbulent induced flame front wrinkling effect becomes significant and may cause flame quenching and misfires. This phenomenon is described by a theoretical flame quenching line defined with the Karlovitz number and the turbulent combustion regime diagram. These three mechanisms are considered in the current model.

Accordingly, the present teachings provide a method and system for a physics-based predictive model having the ability to predict and enable control of misfire that influences combustion cyclic variation and COV of IMEP, which is capable of greatly accelerating the control of highly diluted SI engine combustion by: capturing cycle to cycle variation in flame burning velocity from the propagation of variability in ignition power deposited to fuel and air mixture, local air to fuel equivalence ratio and in-cylinder turbulent intensity and integral length scale; reproducing the occasional misfires that can cause high variability and are introduced by the evolution of early ignition processes when they exceed specific thresholds; capturing the cyclic binomially distributed misfire statistics as a function of controllable variables; and representing the misfire limits as a functional engine parameters and control variables.

The physics based predictive model also has the potential of on-line implementation in an Engine Control Unit (ECU) for transient actuator control aiming to mitigate cyclic variability. The model includes all the necessities to estimate the misfire limits and offers a unique solution. In summary, the model documented here has the structure to achieve the above-recited elements and to be used in the future to (i) shift the operating point to avoid misfire and (ii) control the external ignition source from cycle to cycle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of predicting misfire that influences combustion cyclic variation and convariance of indicated mean effective pressure (COV of IMEP) in spark-ignited (SI) engine, the spark-ignited engine having at least one cylinder, the method comprising:

obtaining engine data and determining temperature and pressure within the cylinder in response to the engine data;

determining crank angle resolved flame velocity evolution based on the engine data;

comparing the crank angle resolved flame velocity to predetermined turbulent combustion regime data to determine a misfire occurrence; and updating a misfire occurrence indicator and outputting a control signal when the misfire occurrence indicator is greater than a predetermined limit, the control signal being capable of adjusting an engine actuator of the spark-ignited engine on a cycle to cycle basis, wherein the determining crank angle resolved flame velocity comprises determining crank angle resolved flame velocity based on a flame model module, the flame model module is executed on a crank angle basis and comprises a flame kernel initiation model, a laminar flame burning velocity model, a variable volume flame model, and a turbulent combustion regime model.

2. The method according to claim 1 wherein the determining temperature and pressure within the cylinder comprising estimating temperature and pressure within the cylinder in response to the engine data.

3. The method according to claim 2 wherein the engine data is obtained from one or more engine sensors operably coupled to the engine.

4. The method according to claim 3 wherein the one or more engine sensors comprises at least one of an intake manifold thermocouple, an exhaust gas recirculation runner thermocouple, an exhaust runner thermocouple, and a pressure sensor.

5. The method according to claim 1 wherein the crank angle resolved flame velocity is cyclic binomially distributed in response to cycle to cycle variation in ignition power and variation in local air to fuel equivalence ratio.

6. The method according to claim 1, further comprising:
correlating the crank angle resolved flame velocity to combustion phasing when the misfire occurrence indicator is less than the predetermined limit.

7. A method of predicting misfire that influences combustion cyclic variation and convariance of indicated mean effective pressure (COV of IMEP) in spark-ignited (SI) engine, the spark-ignited engine having at least one cylinder, the method comprising:
obtaining engine data and determining temperature and pressure within the cylinder in response to the engine data;
determining crank angle resolved flame velocity evolution based on the engine data;
comparing the crank angle resolved flame velocity to predetermined turbulent combustion regime data to determine a misfire occurrence; and
updating a misfire occurrence indicator and outputting a control signal when the misfire occurrence indicator is greater than a predetermined limit, the control signal being capable of adjusting an engine actuator of the spark-ignited engine on a cycle to cycle basis,
wherein the determining crank angle resolved flame velocity comprises determining crank angle resolved flame velocity based on a flame model module, the flame model module is executed on a crank angle basis and comprises at least one of a flame kernel initiation model, a laminar flame burning velocity model, a variable volume flame model, and a turbulent combustion regime model,
wherein the flame kernel initiation model determines a spherical flame trajectory having a normalized flame burning velocity and a normalized flame radius.

8. A method of predicting misfire that influences combustion cyclic variation and convariance of indicated mean effective pressure (COV of IMEP) in spark-ignited (SI) engine, the spark-ignited engine having at least one cylinder, the method comprising:
obtaining engine data and determining temperature and pressure within the cylinder in response to the engine data;
determining crank angle resolved flame velocity evolution based on the engine data;
comparing the crank angle resolved flame velocity to predetermined turbulent combustion regime data to determine a misfire occurrence; and
updating a misfire occurrence indicator and outputting a control signal when the misfire occurrence indicator is greater than a predetermined limit, the control signal being capable of adjusting an engine actuator of the spark-ignited engine on a cycle to cycle basis,
wherein the determining crank angle resolved flame velocity comprises determining crank angle resolved flame velocity based on a flame model module, the flame model module is executed on a crank angle basis and comprises at least one of a flame kernel initiation model, a laminar flame burning velocity model, a variable volume flame model, and a turbulent combustion regime model,
wherein the laminar flame burning velocity model determines a laminar flame burning velocity with respect to unburned and burned gases and further determines the laminar flame thickness.

9. A spark-ignited engine having a system for predicting misfire, the spark-ignited engine comprising:
at least one cylinder;
one or more engine sensors operable to obtain engine data;
a control system adapted to determine temperature and pressure within the cylinder in response to the engine data, the control system adapted to determine crank angle resolved flame velocity evolution based on the engine data and compare the crank angle resolved flame velocity to predetermined turbulent combustion regime data to determine a misfire occurrence, the control system adapted to update a misfire occurrence indicator and output a control signal when the misfire occurrence indicator is greater than a predetermined limit, the control signal being usable for adjusting an engine actuator of the spark-ignited engine on a cycle by cycle basis,
wherein the control system determines the crank angle resolved flame velocity based on a flame model module, the flame model module is adapted to be executed on a crank angle basis and comprises a flame kernel initiation model, a laminar flame burning velocity model, a variable volume flame model, and a turbulent combustion regime model.

10. The spark-ignited engine according to claim 9 wherein the control system estimates temperature and pressure within the cylinder in response to the engine data.

11. The spark-ignited engine according to claim 9 wherein the one or more engine sensors comprises at least one of an intake manifold thermocouple, an exhaust gas recirculation runner thermocouple, an exhaust runner thermocouple, and a pressure sensor.

12. The spark-ignited engine according to claim 9 wherein the crank angle resolved flame velocity is cyclic binomially distributed in response to cycle to cycle variation in ignition power and variation in local air to fuel equivalence ratio.

13. The spark-ignited engine according to claim 9 wherein the control system is adapted to correlate the crank angle resolved flame velocity to combustion phasing when the misfire occurrence indicator is less than the predetermined limit.

14. A spark-ignited engine having a system for predicting misfire, the spark-ignited engine comprising:
at least one cylinder;
one or more engine sensors operable to obtain engine data;
a control system adapted to determine temperature and pressure within the cylinder in response to the engine data, the control system adapted to determine crank angle resolved flame velocity evolution based on the engine data and compare the crank angle resolved flame velocity to predetermined turbulent combustion regime data to determine a misfire occurrence, the control system adapted to update a misfire occurrence indicator and output a control signal when the misfire occurrence indicator is greater than a predetermined limit, the control signal being usable for adjusting an engine actuator of the spark-ignited engine on a cycle by cycle basis, wherein the control system determines the crank angle resolved flame velocity based on a flame model module, the flame model module is adapted to be executed on a crank angle basis and comprises at least one of a flame kernel initiation model, a laminar flame burning velocity model, a variable volume flame model, and a turbulent combustion regime model, wherein the flame kernel initiation model is adapted to determine a spherical flame trajectory having a normalized flame burning velocity and a normalized flame radius.

15. A spark-ignited engine having a system for predicting misfire, the spark-ignited engine comprising:
- at least one cylinder;
- one or more engine sensors operable to obtain engine data;
- a control system adapted to determine temperature and pressure within the cylinder in response to the engine data, the control system adapted to determine crank angle resolved flame velocity evolution based on the engine data and compare the crank angle resolved flame velocity to predetermined turbulent combustion regime data to determine a misfire occurrence, the control system adapted to update a misfire occurrence indicator and output a control signal when the misfire occurrence indicator is greater than a predetermined limit, the control signal being usable for adjusting an engine actuator of the spark-ignited engine on a cycle by cycle basis, wherein the control system determines the crank angle resolved flame velocity based on a flame model module, the flame model module is adapted to be executed on a crank angle basis and comprises at least one of a flame kernel initiation model, a laminar flame burning velocity model, a variable volume flame model, and a turbulent combustion regime model, wherein the laminar flame burning velocity model is adapted to determine a laminar flame burning velocity with respect to unburned and burned gases and further determines the laminar flame thickness.

16. The method according to claim 1 wherein cycle to cycle variation in ignition power deposited to the fuel and air mixture and variation in local air to fuel equivalence ratio propagate through the flame model module and result in cyclic binomially distributed misfires.

* * * * *